Patented Nov. 13, 1934

1,980,385

UNITED STATES PATENT OFFICE 1,980,385

SEPARATION OF PARA CRESOL FROM A LIQUID PHENOLIC MIXTURE

Frederick Comte, Webster Groves, Mo., assignor to Monsanto Chemical Company, St. Louis, Mo., a corporation of Delaware No Drawing. Application November 25, 1933, Serial No. 699,712

6 Claims. (Cl. 260—154)

This invention relates to the separation of para cresol from a mixture of liquid phenolic substances with which it is commonly associated and which are not readily separable by ordinary physical means. It represents an improvement on the well-known process for isolating para cresol by means of oxalic acid described in German Patent 137,584 of 1903 to Rutgers.

The cresols which are obtained in commerce are by-products of the destructive distillation of coal and are recovered in their crude form physically admixed with phenol as well as several xylenols. Due to the differences in boiling points it is possible to separate phenol, ortho-cresol and most of the xylenols, from the crude mixture. However, para cresol cannot be separated from meta cresol and certain of the xylenols due to the fact that the boiling points of these substances are practically identical. For this reason other methods of separation have in the past been employed. Among these methods are those which depend upon the formation of a solid addition compound with one of the constituents from which the other constituent may be separated by physical means, after which the separated addition compound is resolved into its components.

One such method takes advantage of the fact that anhydrous oxalic acid combines with para cresol to form a solid addition product which may be separated from the liquid residue. According to this method the solid is resolved into its constituents by the addition of a small quantity of water. The phenolic fraction may be isolated from the oxalic acid solution by solvent extraction or distillation. While this method enables one to obtain a product which is of distinctly higher para cresol content it does not give a pure cresol directly but, on the contrary, gives a product having not substantially more than 80% para cresol. This is probably due to the fact that oxalic acid not only combines with para cresol but will, under certain conditions, combine also with other phenolic materials, notably meta cresol. Furthermore, the resolution of the solid addition compound into its constituents is attained with certain disadvantages and obstacles. One of the principal disadvantages and obstacles arises from the fact that when the solid addition compound is treated with water two layers are formed, one an aqueous layer of oxalic acid, the other an oily layer of para cresol. The oily layer contains a substantial amount of water and oxalic acid dissolved therein. Furthermore, the aqueous layer contains some para cresol. The separation of the layers into their respective constituents is for practical purposes almost impossible of attainment and renders the process, as a whole, costly and of very little commercial importance.

The present invention has as its object the obviation and minimization of the foregoing disadvantages and difficulties.

I have found that of the several addition products of oxalic acid formed in this process, the para cresol addition product is substantially more stable at moderately elevated temperatures than other phenolic addition products of oxalic acid and that it is feasible to selectively remove the contaminating addition products whereby a para cresol having a purity of 97% and better is directly obtainable.

I have further found that the resolution of the addition product can be effected in the absence of water and preferably in the presence of a non-aqueous, inert liquid solvent for para cresol. As a result of the resolution under these conditions one obtains a solution of para cresol in the solvent and solid anhydrous oxalic acid which is in excellent condition for immediate reuse without further operations.

The various non-aqueous solvents for para cresol may be employed such as benzol, toluol, carbon tetra chloride, etc. However, I have obtained the best results both from the standpoint of the purity of the product and economy of operation with petroleum naphtha. For this purpose a petroleum naphtha which has a boiling range that is sufficiently removed from that of para cresol to enable one to separate the same easily by fractional distillation is to be preferred. A naphtha having a substantially higher boiling range than para cresol may be employed successfully and has the advantage of lowering the solvent losses. The preferred naphtha is one which boils substantially below the boiling point of para cresol. A cut having a boiling range of 90°–100° C. has been found to be particularly effective, although cuts which are substantially higher in boiling range but which nevertheless are sufficiently below the boiling point of para cresol to enable one to effect the separation of a mixture thereof with para cresol by fractional distillation may be employed.

The following example will serve to illustrate the application of the principles of my invention:

77 kilos of finely ground anhydrous oxalic acid are mixed with 280 litres of petroleum solvent naphtha having a boiling range of 90°–100° C. The resultant mixture is heated to the boiling temperature. 216.6 kilos of cresol having the following weight ratio of ingredients:

| | Per cent |
|---|---|
| Para cresol | 64.8 |
| Meta cresol | 32.9 |
| Ortho cresol and xylenols | 2.3 | are added slowly while maintaining the boiling temperature of the mixture. After all of the cresol is added the mixture is refluxed for 10 minutes and then permitted to cool over a period of approximately six hours to room temperature (25°–28° C.). The formation of the solid addition compound is permitted to complete itself by allowing the mixture to stand overnight. The resultant suspension is then filtered to separate the liquid fraction and the crystalline product is washed with fresh solvent in successive portions of approximately 75 litres each. One thus obtains 233 kilos of crystalline product. Assuming the addition compound to consist of one mol of oxalic acid and two mols of para cresol, I employ 32% excess of oxalic acid based on the amount of para cresol present in the mixture.

One method of effecting resolution of the crystalline product into its constituents, according to the present invention, consists in boiling the crystals in 1500 litres of fresh solvent, filtering the hot suspension, again treating the residue with 1500 litres of fresh boiling solvent, recovering the residue, and finally similarly treating the residue with 1220 litres of boiling solvent, and again filtering the suspension. The residue consists essentially of anhydrous oxalic acid which is in excellent condition to be used again in the first step of the process. The combined filtrates yield 127.5 kilos of cresol having a purity of approximately 92% para cresol.

If instead of boiling the original crystalline product with 1500 litres of solvent, as described hereinabove, one employs a lower temperature, for example 70°–80° C., or preferably a lesser quantity, say 750 litres, of boiling solvent and keeps the filtrate thus obtained separate from the filtrate obtained in the two or three subsequent resolving operations, one resolves a preponderance of the impurities which are present in the form of oxalic acid addition products and thereby obtains a para cresol in the subsequent steps of the resolution which is of higher purity. In this way I have been able to obtain in good yields a para cresol of 96%–98.5% purity. The precise temperature for the selective dissolution step will vary somewhat with the nature of the raw material and particularly the kind and amounts of phenolic substances which are present in the liquid phenolic mixture.

If desired, one may effect the resolution of the addition compound by simply distilling off the cresol preferably at reduced pressure or with the aid of vapors of an inert, non-aqueous solvent such as benzol, petroleum naphtha, etc. which may be superheated to effect more rapid and complete volatilization of the cresol.

The number of treatments whereby the decomposition of the addition compound or its resolution into its constituents is optional. In general, three treatments will be found sufficient at approximately 100° C. If a higher boiling solvent be employed decomposition will be more complete in fewer steps. If desired, one may effect the decomposition under pressure whereby higher temperatures are possible and pressure filtration may be employed advantageously to separate the residue from the solvent medium.

It is to be understood that the invention is not restricted to the particular phenolic composition described in the foregoing example but on the contrary it is applicable to compositions of widely varied nature. It is also to be understood that the conditions of the temperature, the boiling range of the naphtha solvent, the amount of excess oxalic acid employed and other conditions of operation may be changed within the spirit of the present invention.

What I claim is:

1. In the separation of para cresol from a liquid phenolic mixture containing the same by means of oxalic acid whereby a solid addition compound of para cresol and oxalic acid is formed which is separable from the liquid phenolic residue, the step of resolving the separated addition compound into its constituents which comprises heating the same to its decomposing temperature in the absence of water and below the decomposing temperature of the oxalic acid.

2. The method as defined in claim 1 and further characterized in that the resolution is effected with the aid of vapors of a non-aqueous substance which in liquid form is a solvent for meta cresol.

3. In the separation of para cresol from a liquid phenolic mixture containing the same by means of oxalic acid whereby a solid addition compound of para cresol and oxalic acid is formed which is separable from the liquid phenolic residue, the step of resolving the addition compound into its constituents which comprises heating the same to its decomposing temperature in an inert, non-aqueous solvent for para cresol and in the absence of water.

4. The method as defined in claim 3 and further characterized in that the solvent is a petroleum naphtha whose boiling range is sufficiently removed from the boiling point of para cresol to enable one to effect separation thereof by fractional distillation.

5. The method as defined in claim 3 and further characterized in that the addition compound is subjected to a preliminary resolution whereby the relatively less stable cresol-oxalic acid addition compounds are resolved into their constituents, separating the solvent, and subsequently recovering the para cresol from the para cresol-oxalic acid addition compound.

6. In the method of isolating para cresol by means of the oxalic acid-para cresol addition compound according to which solid addition products of oxalic acid and phenols other than para cresol are formed as impurities, the step of separating the solid impurities before resolving the para cresol-oxalic acid addition product into its constituents which comprises subjecting the crude mixture to selective resolution and dissolution of the foreign phenolic addition products, and subsequently decomposing the purified solid into para cresol and oxalic acid.

FREDERICK COMTE.